United States Patent
Yamada et al.

[11] Patent Number: 6,165,936
[45] Date of Patent: Dec. 26, 2000

[54] METHOD FOR PRODUCING ALUMINA-BASED POROUS SUPPORTS

[75] Inventors: Takao Yamada; Kazuhito Tsumuki, both of Nagoya, Japan

[73] Assignee: Noritake Co., Ltd., Nagoya, Japan

[21] Appl. No.: 09/120,879

[22] Filed: Jul. 23, 1998

[30] Foreign Application Priority Data

Jul. 25, 1997 [JP] Japan .................................. 9-215953

[51] Int. Cl.[7] ........................... B01J 21/04; C04B 38/00; C04B 38/06; B28B 1/00; B29C 65/00
[52] U.S. Cl. ..................... 502/439; 501/80; 501/83; 501/84; 264/42; 264/43; 264/44; 264/605; 264/606; 264/629; 264/630; 264/631; 264/652; 264/671
[58] Field of Search ............................ 502/439; 264/44, 264/414, 415, 42, 43, 606, 629, 630, 631, 605, 652, 671; 432/11, 95, 69, 121; 501/80, 83, 84

[56] References Cited

U.S. PATENT DOCUMENTS

| | | |
|---|---|---|
| 3,880,969 | 4/1975 | Latos .......................................... 264/44 |
| 3,886,244 | 5/1975 | Bayer et al. ................................ 264/44 |
| 3,905,758 | 9/1975 | Moussou et al. ......................... 432/128 |
| 4,120,780 | 10/1978 | Morimoto et al. ....................... 208/211 |
| 4,243,378 | 1/1981 | Chronberg ................................. 432/11 |
| 4,307,051 | 12/1981 | Sargeant et al. ........................... 264/53 |
| 4,490,107 | 12/1984 | Kimura et al. ............................. 432/11 |
| 4,990,398 | 2/1991 | Funumoto et al. .................... 428/312.2 |
| 4,996,024 | 2/1991 | Nishio et al. .............................. 419/40 |
| 5,046,946 | 9/1991 | Yasuda et al. ............................. 432/11 |
| 5,207,830 | 5/1993 | Cowan et al. ........................... 106/672 |
| 5,395,572 | 3/1995 | Brotz ......................................... 264/43 |
| 5,589,426 | 12/1996 | Iwasaki et al. ............................ 501/32 |
| 5,685,986 | 11/1997 | Yamada et al. ......................... 210/496 |
| 5,804,324 | 9/1998 | Niwa et al. .............................. 428/701 |
| 5,876,640 | 3/1999 | Miyahara et al. ......................... 264/42 |
| 5,902,653 | 5/1999 | Miyahara et al. ..................... 428/34.1 |

*Primary Examiner*—Tom Dunn
*Assistant Examiner*—Cam N. Nguyen
*Attorney, Agent, or Firm*—Oblon, Spivak, McClelland, Maier & Neustadt, P.C.

[57] ABSTRACT

An alumina-based porous support with uniform physical properties is obtained in a rapid sintering process. An alumina raw material including a raw alumina powder and an inorganic binder is molded into an article, and the article is then sintered for 5 to 8 hours at 1520 to 1560° C. using a roller hearth kiln.

4 Claims, 5 Drawing Sheets

METHOD FOR PRODUCING ALUMINA-BASED POROUS SUPPORTS

BACKGROUND OF THE INVENTION

1. Field of the Invention

The present invention relates to a method for producing an alumina-based porous support used as a catalyst support and the like.

2. Description of the Related Art

An alumina-based porous support as one of industrial catalyst supports employed in various chemical reactions are known.

Such an alumina-based porous support can be produced as follows.

An alumina raw material is extruded into a molded article such as Raschig ring-shaped molded article in a size of several mm and weighing about several hundreds mg.

Such molded article is filled in a saggar. The saggar is filled in a sintering furnace and the molded article is sintered indirectly. After completion of the sintering, an alumina-based porous support thus sintered is removed from the saggar.

In such sintering process, it is essential to perform the sintering at a constant temperature for obtaining an alumina-based porous support having uniform physical properties.

For this purpose, the use of a corner jet burner is proposed in a single furnace.

It is also proposed that the saggar described above is mounted on a cart (See FIG. 4) which travels through a tunnel having a certain temperature gradient (See FIG. 5) whereby effecting the sintering (a tunnel furnace).

In this method, a uniform heating of the inside of the saggar is ensured, for example, by forming the saggar into an appropriate shape. The uniform heating throughout the all sintering containers is ensured by mounting the containers on the carts in an appropriate condition.

However, the conventional methods described above still involve the following problems.

One problem is an insufficient uniformity in the temperature distribution throughout the inside of the furnace because of difficulty in sintering at a high temperature (1500° C. or higher) in a conventional method. Accordingly, it is difficult to obtain an alumina-based porous support having uniform physical properties by means of the conventional method.

Such difficulty in sintering at a high temperature in a conventional method also causes an extremely prolonged sintering period.

Especially, in a furnace having a large capacity, the sintering period is required to be as long as 70 to 80 hours, or sometimes be 1 week to 10 days, approximately.

The absence of the tightly controlled temperature inside of the furnace and the absence of homogeneity in the composition of a raw material (especially in water content) may also contribute to the formation of an alumina-based porous support having a poor catalyst performance. These problems are attempted to be overcome usually by means of adjustment of the furnace temperature and the raw material composition based on the results of investigation of a sintered alumina-based porous support.

Such an adjustment, however, can only be conducted at earliest 80 hours from the beginning of the production when the sintering takes 80 hours. Meanwhile, the molded article is introduced in the furnace and sintered successively during the period before the adjustment. In such a case, a large number of an alumina-based porous support having a low performance or undesirable physical properties are produced successively.

Thus the completion of the sintering within a shorter period is desirable.

SUMMARY OF THE INVENTION

To overcome the problems mentioned above, it is therefore an object of the present invention to provide a method for producing an alumina-based porous support by which a rapid sintering is possible and an alumina-based porous support having uniform physical properties can be obtained.

The present invention is a method for producing an alumina-based porous support wherein an alumina raw material consisting of an alumina powder and an inorganic binder is molded into an article which is then subjected to the sintering for 5 to 8 hours at 1520 to 1560° C. using a roller hearth kiln.

In a method of the present invention, a roller hearth kiln is used to sinter at a temperature for a period in the conditions specified above.

By such a method, the sintering can be completed in a short period.

An alumina-based porous support obtained by a method of the present invention undergoes less variance in physical properties such as water absorption, specific surface area, packing density (See Embodiment 1), thus exhibiting an excellent catalyst performance.

As mentioned above, a method for producing an alumina-based porous support having an uniform physical property by which a rapid sintering is possible is provided according to the present invention.

DETAILED DESCRIPTION OF THE INVENTION

In the present invention, a molded article made from an alumina raw material is sintered using a roller hearth kiln.

Figure 1:
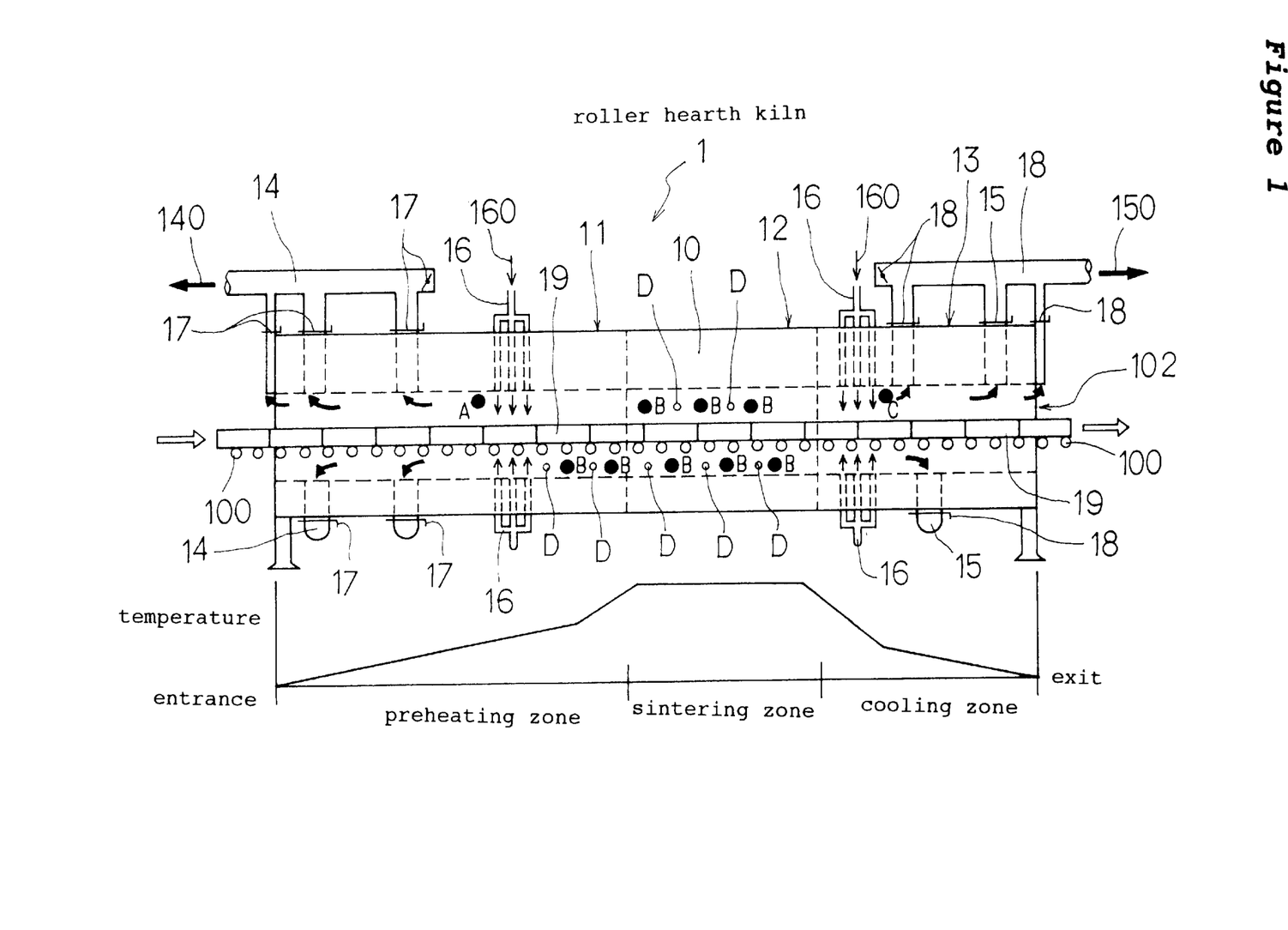
FIG. 1 is a schematic view showing a structure of a roller hearth kiln according to Embodiment 1 together with a graphic representation indicating a temperature gradient in a tunnel.

The roller hearth kiln is one of tunnel furnaces and, as shown in FIG. 1, consists of a tunnel and a number of roller provided in the tunnel for the purpose of transporting the article to be sintered. In the tunnel, a heating device is provided to heat the inside of the tunnel to achieve an appropriate temperature gradient (See FIG. 5). Such heating devices may be those utilizing liquid fuels and gas fuels or utilizing electric heating.

In the roller hearth kiln described above, an article to be sintered (a molded article made from an alumina raw material in the present invention) is transported from the entrance to the exit of the tunnel on the rollers which rolling therein.

During this transportation, the article to be sintered is heated gradually, sintered at a certain temperature and then cooled gradually.

The state of the rolling of the rollers described above is preferably maintained in the same condition. In this manner, the molded article made from the alumina raw material described above can always be transported at a constant speed. As a result, a constant sintering condition can always be kept.

Alternatively, the molded article is filled in a saggar, which may in turn be introduced to a roller hearth kiln to effect an indirect sintering.

An molded article is sintered at 1520° C. for a period of 5 to 8 hours. A sintering temperature below 1520° C. results in an increased water absorption and an increased specific surface area which causes difficulty in obtaining desired physical properties, which may lead to a reduced catalyst performance and a reduced mechanical strength. On the other hand, a sintering temperature exceeding 1560° C. results in a reduced water absorption and a reduced specific surface area which causes difficulty in obtaining a desired physical property, which may lead to a reduced catalyst performance. In addition, too high a temperature may accelerate deterioration of the furnace and sintering instruments. The temperature discussed herein is the maximum temperature of the inside of a roller hearth kiln, at which an molded article is sintered.

When the sintering period is less than 5 hours, defatting and mechanical strength may become insufficient. When the sintering period exceeds 8 hours, a rolling speed of the rollers becomes slower, resulting in bending rollers or a reduced production.

The alumina raw material described above may for example be the mixture of 92 to 97 parts by weight of a low sodium alumina secondary particle as an alumina powder and 3 to 8 parts by weight of mullite-based inorganic binder.

Additives such as molding aids, binders, adhesives, foaming agents may also be added to the alumina raw material described above.

It is preferable to add 2.3 to 4.0 parts by weight of carboxymethyl cellulose to 100 parts by weight of the alumina raw material described above.

Such addition serves to increase the number of the pores having the pore sizes within the range from 10 to 100 $\mu$m, resulting in an excellent alumina-based porous support capable of being used as a support for a catalyst for production of ethylene oxide (See Embodiment 2).

It is preferable to add 1 to 15 parts by weight of a foaming agent to 100 parts by weight of the alumina raw material described above.

Such addition serves to increase the number of the pores having the pore sizes within the range from 10 to 100 $\mu$m, resulting in an excellent alumina-based porous support capable of being used as a support for a catalyst for producing ethylene oxide (See Embodiment 2).

The foaming agent described above may be walnut powder. Such walnut powder is preferably has a particle size of 125 to 1000 $\mu$m. The foaming agent may also be nut shells, petroleum cokes, carbon powders, graphite, polyethylene and the like.

The alumina raw material described above consists of an alumina powder and an inorganic binder, and contains a fused alumina, if necessary. Such a fused alumina is preferably contained in 100 parts by weight of the alumina raw material described above including the fused alumina in an amount of 10 to 25 parts by weight.

Such addition serves to increase the number of the pores having the pore sizes within the range from 10 to 100 $\mu$m, resulting in an excellent alumina-based porous support capable of being used as a support for a catalyst for production of ethylene oxide (See Embodiment 2).

The fused alumina described above may preferably be a coarse particle having a particle size of 125 to 500 $\mu$m.

EMBODIMENTS

Embodiment 1

Methods of producing the alumina-based porous supports according to the embodiments of the present invention and the performances of the alumina-based porous supports obtained by the same are described hereinafter with reference to FIG. 1 to FIG. 5.

An alumina-based porous support of this embodiment is produced by molding an article from an alumina raw material consisting of an alumina powder and an inorganic binder, followed by sintering the molded article in a roller hearth kiln at 1520° C. for 8 hours.

This method is detailed below.

92.6 parts by weight of a low sodium alumina secondary particle and 7.4 parts by weight of a mullite-based inorganic binder were mixed to obtain an alumina raw material.

The low sodium alumina secondary particle used here contained 99.7 % or more of $Al_2O_3$, had a median particle size of 35 to 55 $\mu$m, an $\alpha$-alumina crystal size of 2 to 4 $\mu$m, $Na_2O$ content of 0.1% or less.

The mullite-based inorganic binder used here was the one in which particles having particle sizes of 8 $\mu$m or less were present in an amount of 65 % or more of the entire weight.

To 100 parts by weight of the alumina raw material, 2.0 parts by weight of carboxymethylcellulose, 1.0 part by weight of microcrystalline cellulose and 10 parts by weight of wax emulsion were added all as molding aids and binders, together with 5 parts by weight of walnut powder (size #60) as a foaming agent and 28 parts by weight of water.

The mixture obtained was kneaded by means of a kneading machine, and then extruded to obtain a Raschig ring-shaped molded article 8 mm in the external diameter, 3 mm in the internal diameter and 8 mm in the length. This article was dried for 2 hours at 60 to 100° C. and then placed in a saggar.

Figure 3:
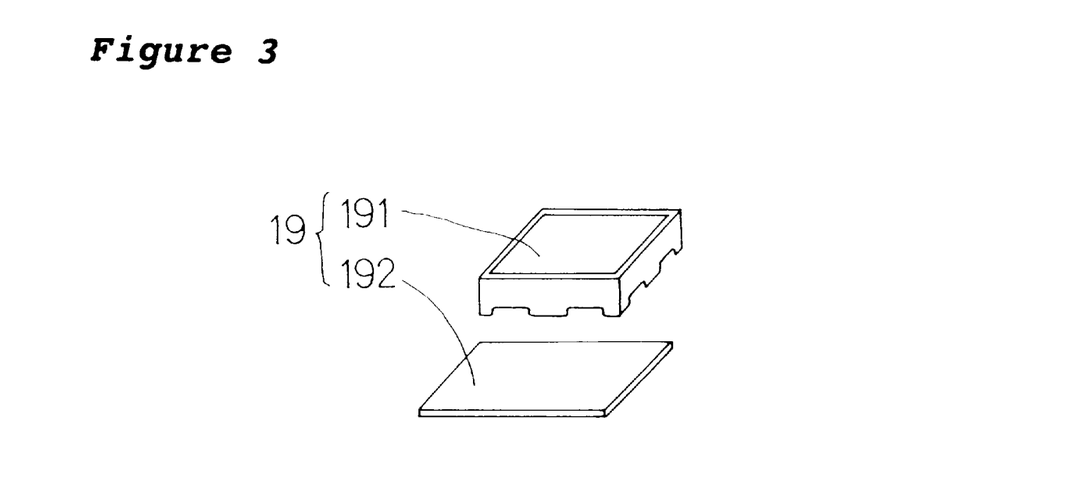
FIG. 3 is a schematic view showing a saggar according to Embodiment 1.

As shown in FIG. 3, the saggar 19 consisted of a sintering setter 192 loaded with a sintering frame 191, comprised alumina and silica which were refractory.

Sintering using a roller hearth kiln is described below.

This sintering process was conducted at the maximum sintering temperature of 1520° C. for the sintering period of 8 hours. This sintering process was represented by a heat curve (a curve representing the relationship between a sintering temperature and a sintering period) shown in FIG. 5.

A roller hearth kiln 1 comprised a tunnel 10 and a number of rollers 100 provided in the tunnel 10 for transporting molded articles to be sintered as shown in FIG. 1.

Figure 2:
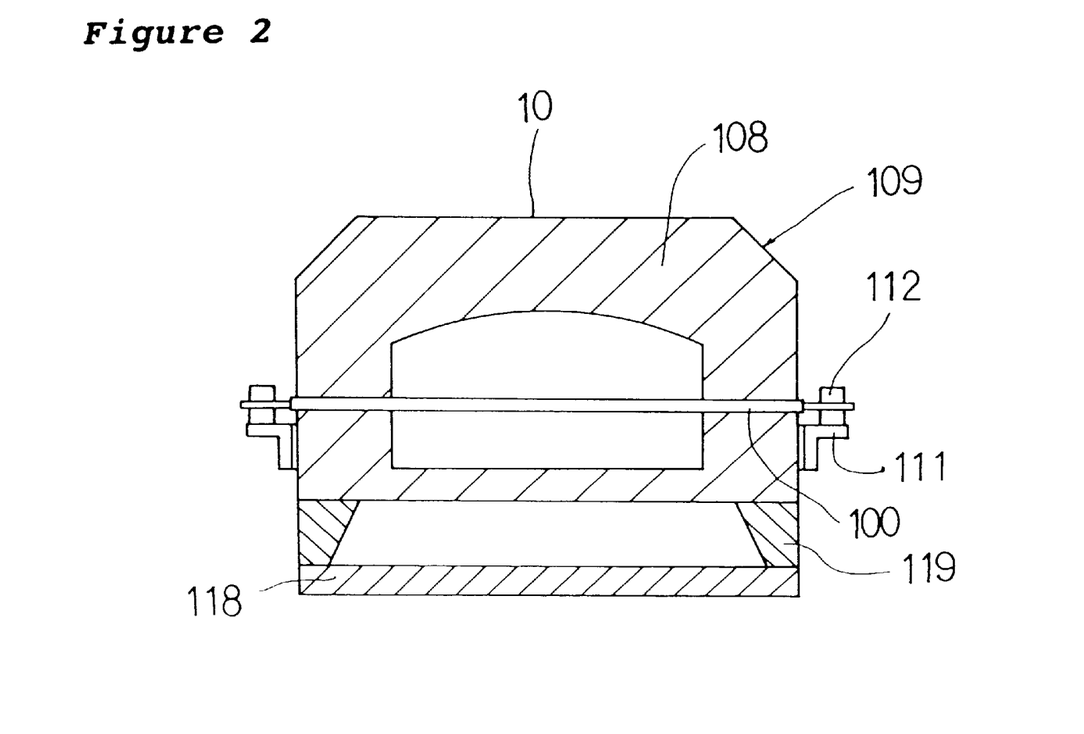
FIG. 2 is a schematic sectional view showing a roller hearth kiln according to Embodiment 1.

As shown in FIG. 2, the roller 100 is placed as penetrating the tunnel 10 and supported movably by guides 111 and 112.

In the tunnel 10 described above, an article to be sintered is introduced through a tunnel entrance 101 and an article once sintered is shipped out from a tunnel exit 102. In this embodiment, a molded article filled in the saggar 19 is the article to be sintered.

The tunnel 10 consisted of a casing 109 made from a stainless steel and a refractory material 108, and had the shape shown in FIG. 2. Beneath the tunnel 10, a base rack 118 and a side rack 119 are provided.

The tunnel 10 had a preheating zone 11, a sintering zone 12 and a cooling zone 13, and in the preheating zone 11, a preheating temperature controller A, a cooling device 16 and an entrance exhausting device 14 are provided. In the sintering zone 12, a sintering burner B and a sintering temperature controller D are provided. In the cooling zone 13, a cooling temperature controller C, the cooling device 16 and an exit exhausting device 15 are provided.

Through the entrance exhausting device 14 and the exit exhausting device 15, exhaust gases 140 and 150 are exhausted from the top and the bottom of the tunnel 10 to the outside using an exhaust fan that is not illustrated.

In the preheating zone 11, the temperature gradient represented by the graphic representation shown in FIG. 1 is established by means of the cooling device 16, the entrance exhausting device 14 and dampers 17. The cooling device 16 introduces cool air 160 from the upside and from the downside of the rollers 100 and the saggars 19 to control the atmosphere to keep a required temperature. The amount of the gas exhausted from the entrance exhausting device 14 is adjusted by the respective dampers 17 to keep a required temperature.

Also in the cooling zone 13, the temperature gradient represented by the graphic representation shown in FIG. 1 is established by means of the cooling device 16, the exit exhausting device 15 and dampers 18.

For the sintering burner B, a gas fuel was employed.

Into the roller hearth kiln 1 described above, the saggars 19 which are stacked in one tier are introduced and transported through the tunnel 10 at a particular speed.

The saggar 19 is heated by being subjected to the temperature gradient shown in FIG. 1 as a result of travel through the tunnel 10. The molded article in the saggar 19 is sintered to become an alumina-based porous support.

Thus, an alumina-based porous support according to the present invention was obtained.

The alumina-based porous support obtained by a method according to the present invention (utilizing a roller hearth kiln) is explained below while comparing with an alumina-based porous support obtained by a conventional method (utilizing a tunnel furnace) with regard to the performance.

Initially, a molded article made from the alumina raw material described above was filled in a saggar and sintered using a roller hearth kiln as described above to obtain an alumina-based porous support. The conditions in which this sintering was conducted is described hereinafter.

The sintering of the alumina-based porous support in this embodiment was conducted at various combinations of maximum sintering temperatures and sintering periods as shown in Tables 1 to 3. For example, the maximum sintering temperature 1520° C. was combined with the sintering periods 5 hours, 6 hours, 7 hours and 8 hours.

The performances of the alumina-based porous supports obtained in the various sintering processes were summarized in Table 1 to Table 3.

Figure 4:
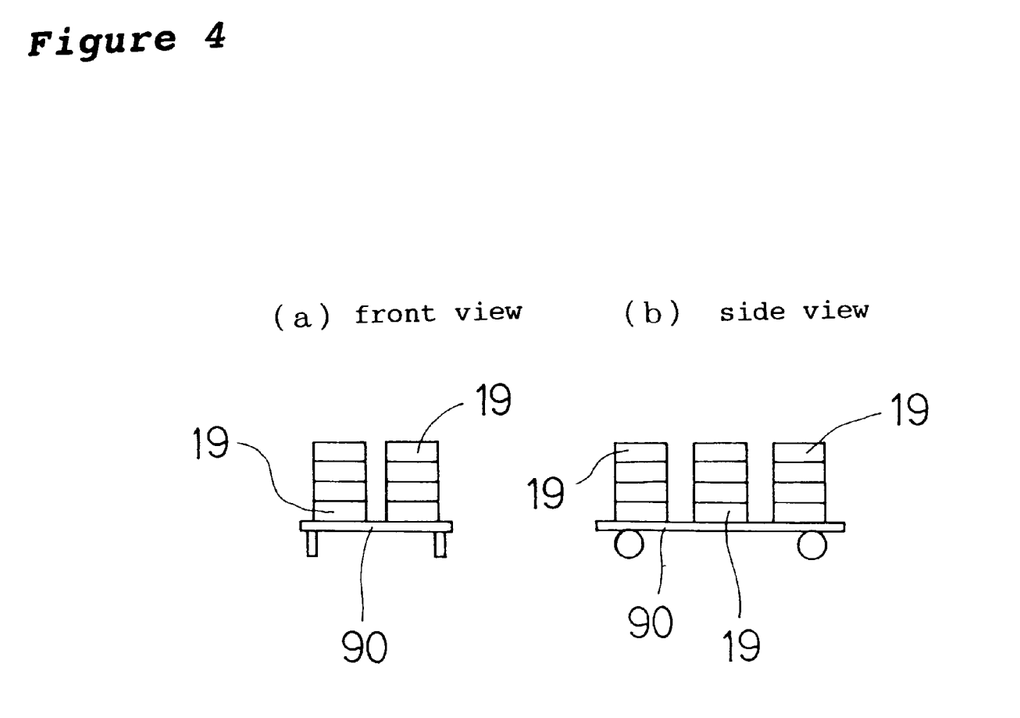
FIG. 4 is a schematic view showing a laminating condition of the saggar in producing samples according to conventional arts.
Figure 5:
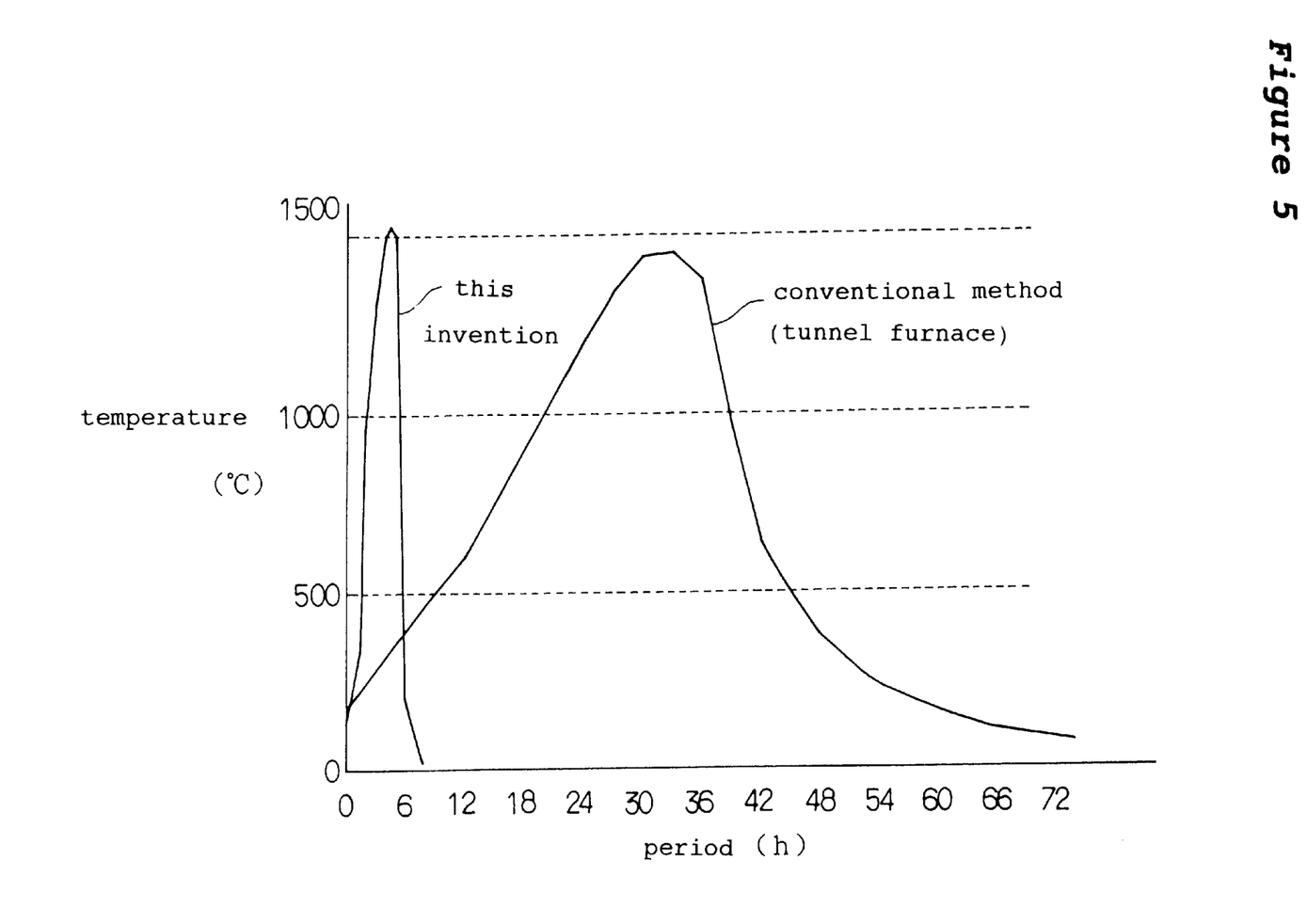
FIG. 5 is a graphic representation showing a sintering heat curve according to the present invention together with that of a conventional method.

An alumina-based porous support according to a conventional method was produced as follows. A molded article made from an alumina raw material described above was filled in the saggar 19, which was four-tier stacked on a sintering cart 90 in two rows and passed through a tunnel furnace heated by burning a crude petroleum, whereby sintering the article. This sintering process was conducted in an oxidative atmosphere with the heat curve shown in FIG. 5.

Thus, the temperature was raised from the room temperature to 1400° C. over a period of 30 hours, then from 1400° C. to 1470° C. over a period of 3 hours, and lowered from 1470° C. to 1400° C. over a period of 3 hours and then from 1400° C. to the room temperature over a period of 40 hours.

This sintering process was practiced by establishing an appropriate temperature gradient in the tunnel furnace through which a sintering cart carrying a saggar containing a molded article was allowed to travel at a constant speed.

As a result, the alumina-based porous support according to the conventional method was obtained. The performances that this alumina-based porous support exhibited were shown in Table 1 to Table 3.

The performances of the alumina-based porous supports described above were evaluated with regard to water absorption, specific surface area and packing density. The evaluation was made by using one ton of each alumina-based porous support produced.

The water absorption was determined in accordance with JIS R2205.

The specific surface area was determined by BET method using $N_2$ gas.

The packing density was determined by pouring each alumina-based porous support into a 1 liter volumetric cylinder from just above the cylinder without vibrating for approximately 30 seconds and then determining the weight of the amount thus filled in the 1 liter volumetric cylinder.

As evident from Table 1 to Table 3, the alumina-based porous supports according to the present invention exhibited the values of water absorption, specific surface area and packing density which were comparable with those of the alumina-based porous supports according to the conventional method.

Therefore, almost no difference in the performance of a catalyst support was observed using any of the alumina-based porous supports.

Thus, because of almost equivalent water absorption (which means almost equivalent pore volume), the supporting rate of a catalyst metal and a promoter capable of being supported by the catalyst support was almost the same. In addition, because of the similar specific surface area, both of the amount of a catalyst capable of being supported and the surface area of the support serving as a reaction site are almost the same. Moreover, because of almost similar packing density, the amount of the support filled in a reaction container of an identical volume became almost the same.

Furthermore, an alumina-based porous support according to the present invention exhibited almost no variance in water absorption, specific surface area or packing density. On the contrary, a conventional support produced by using a tunnel furnace exhibited variations in water absorption, specific surface area and packing density, which were 4%, 0.2 m²/g and 0.02 kg/L, respectively, at maximum.

Based on the results described above, a method according to the present invention, in which a molded article made from an alumina raw material is sintered at 1520 to 1560° C. for 5 to 8 hours, can provide an alumina-based porous support whose performance is comparable with that of a conventional support.

In addition, the method of this invention can reduce the sintering time substantially when compared with a conventional method, resulting in improvement in production efficiency and an easier feed-back adjustment of the process utilizing the data of a sintered article.

Moreover, an alumina-based porous support obtained by the method of this invention undergoes less variance in each of its physical properties, which allows it to perform excellently as a catalyst support.

Accordingly, the method of this invention can provide an alumina-based porous support capable of being sintered rapidly and having uniform physical properties.

TABLE 1

(Water Absorption (wt %))

| | Period | This invention | | | | Conventional arts |
| --- | --- | --- | --- | --- | --- | --- |
| | | 5 hours | 6 hours | 7 hours | 8 hours | Tunnel furnace |
| Temperature | 1520° C. | 39.5 | 39.3 | 36.8 | 36.0 | 35.0–39.0 |
| | 1540° C. | 39.3 | 38.4–37.7 | 36.8 | — | |
| | 1560° C. | — | 36.4 | — | — | |

TABLE 2

(Specific Surface Area ($m^2/g$))

| | Period | This invention | | | | Conventional arts |
| --- | --- | --- | --- | --- | --- | --- |
| | | 5 hours | 6 hours | 7 hours | 8 hours | Tunnel furnace |
| Temperature | 1520° C. | 1.10 | 1.10 | 1.02 | 1.00 | 0.94–1.14 |
| | 1540° C. | 1.06 | 1.02–1.03 | 1.01 | — | |
| | 1560° C. | — | 0.97 | — | — | |

TABLE 3

(Packing Density (kg/l))

| | Period | This invention | | | | Conventional arts |
| --- | --- | --- | --- | --- | --- | --- |
| | | 5 hours | 6 hours | 7 hours | 8 hours | Tunnel furnace |
| Temperature | 1520° C. | 0.735 | 0.744 | 0.772 | 0.778 | 0.760–0.780 |
| | 1540° C. | 0.753 | 0.770–0.775 | 0.775 | — | |
| | 1560° C. | — | 0.782 | — | — | |

Embodiment 2

Figure 6:
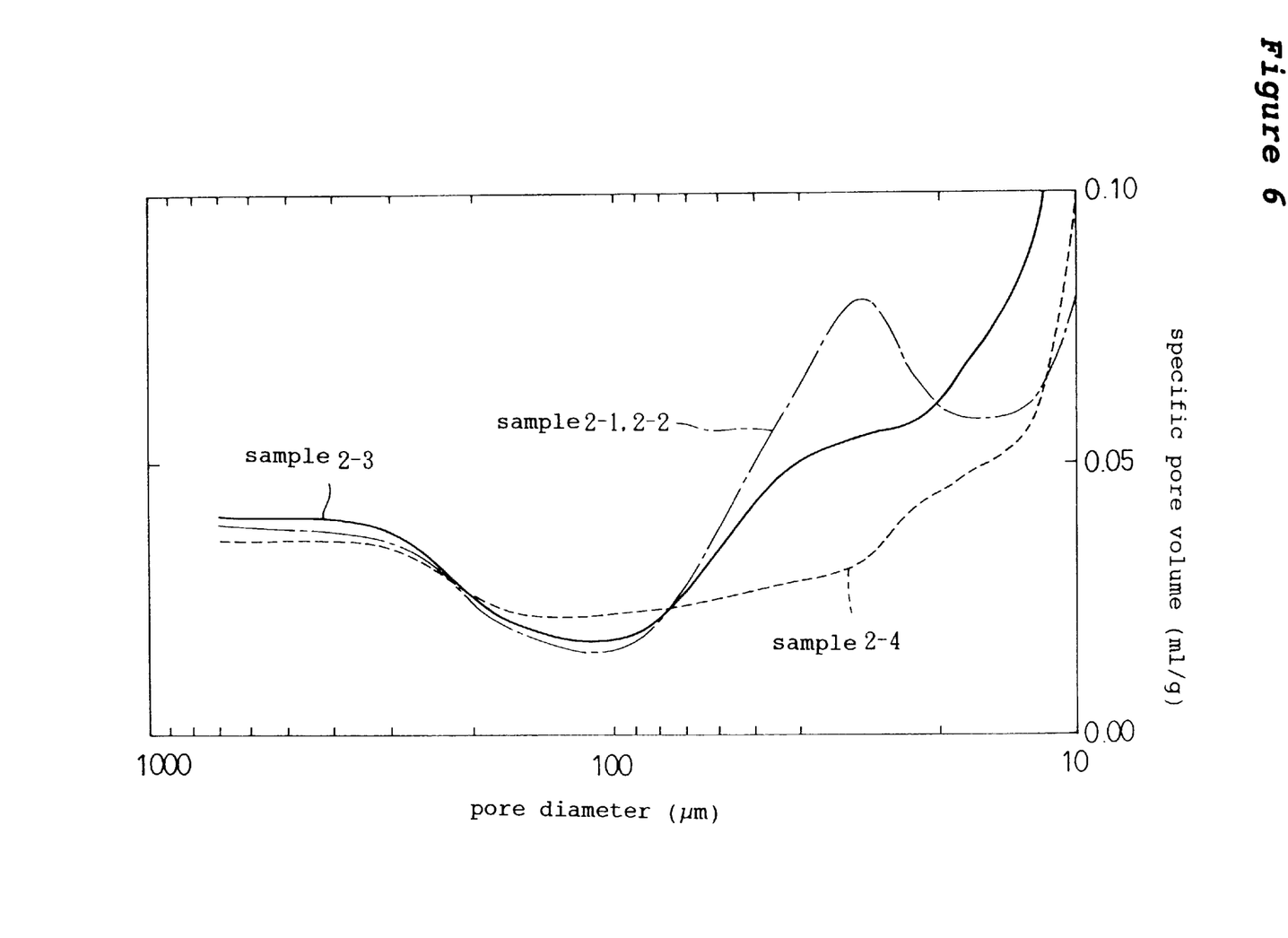
FIG. 6 a graphic representation showing is a micro pore size distribution of the alumina-based porous supports of Samples 2-1 to 2-4 according to Embodiment 2.

With reference to FIG. 6, a method for producing an alumina-based porous support capable of being used in a formation reaction of ethylene oxide is described below together with the performance thereof.

The alumina-based porous support according to this embodiment is also produced by the method in Embodiment 1. In this embodiment, however, carboxymethyl cellulose or a foaming agent or a fused alumina was added to an alumina raw material.

Detailed description is shown below.

100 parts by weight of the alumina raw material employed in Embodiment 1 was admixed with 2.9 parts by weight of carboxymethyl cellulose, 1 part by weight of microcrystalline cellulose as a molding aid and a binder, 10 parts by weight of wax emulsion, 5 parts by weight of walnut powder (size #60) as a foaming agent and 28 parts by weight of water.

The mixture thus obtained was subjected to the process similar to that in Embodiment 1 to form a molded article, which was sintered by using a roller hearth kiln at 1520° C. for 7 hours to yield an alumina-based porous support. This was designated as Sample 2-1.

Separately, 100 parts by weight of the alumina raw material employed in Embodiment 1 was admixed with 2.9 parts by weight of carboxymethyl cellulose, 0.6 parts by weight of microcrystalline cellulose as a molding aid and a binder, 10 parts by weight of wax emulsion, 2.5 parts by weight of walnut powder (size #60) and 2.5 parts by weight of walnut powder (size #36) as a foaming agent and 28 parts by weight of water.

The mixture thus obtained was subjected to the procedure described above to yield an alumina-based porous support. This was designated as Sample 2-2.

77.6 parts by weight of a low sodium alumina secondary particle similar to that in Embodiment 1 was admixed with 7.4 parts by weight of a mullite-based inorganic binder and 15 parts by weight of a fused alumina ($Al_2O_3$:99.5 wt % or more, particle size: #60, $Na_2O$ content: 0.2 wt % or less) to obtain an alumina raw material having a total weight of 100 parts by weight.

100 parts by weight of this alumina raw material was admixed with 2.9 parts by weight of carboxymethyl cellulose, 1 part by weight of methylcellulose as a molding aid and a binder, 10 parts by weight of wax emulsion, 5 parts by weight of walnut powder (size # 60) as a foaming agent and 28 parts by weight of water.

The mixture thus obtained was subjected to the process described above to yield an alumina-based porous support. This was designated as Sample 2-3.

Separately, 100 parts by weight of this alumina raw material according to Embodiment 1 was admixed with 2 parts by weight of carboxymethyl cellulose, 1 part by weight of microcrystalline cellulose as a molding aid and a binder, 10 parts by weight of wax emulsion, 5 parts by weight of walnut powder (size # 60) as a foaming agent and 28 parts by weight of water.

From the mixture thus obtained, an alumina-based porous support was produced. This was designated as Sample 2-4.

The mixture identical to the composition for Sample 2-4 was sintered by using a tunnel furnace similarly to Embodiment 1 to obtain Comparative Sample C2-1.

Each of the samples and the comparative sample obtained was examined for water absorption, specific surface area, packing density similarly to Embodiment 1, and the results are shown in Table 3 and Table 4.

Apparent porosity was determined in accordance with JIS R2205 and the results are shown in Table 4 and Table 5.

$Na_2O$ content was determined in accordance with JIS R2212 and the results are shown in Table 4 and Table 5.

Each of the samples and comparative sample obtained was examined also for the performance when used as a catalyst for synthesis of ethylene oxide. Thus, the molar number of the ethylene which was converted to ethylene oxide, α, and the molar number of the ethylene which was reacted, β, in the ethylene oxide synthesis reaction were determined.

From the values thus determined, % Selection=(α/β)×100 was calculated and the results were shown in Table 4 and Table 5. The % selection is represented as a relative value based on the value of Comparative Sample C2-1 which was regarded as a control (zero value).

The pore size distributions of Samples 2-1 to 4 were obtained by a mercury compression method and the results are shown in FIG. 6.

As evident from Table 4 and Table 5, the alumina-based porous supports according to the present invention exhibited the values of water absorption, specific surface area, packing density, apparent porosity and $Na_2O$ content which are comparable with those of the alumina-based porous supports according to the conventional method.

The pore size distribution curve shown in FIG. 6, however, revealed higher % selections of Samples 2-1 and 2 having peaks within a range from 10 to 100 μm when compared with Sample 2-4 having no such peak. Sample 2-3 having a broad peak within the range mentioned above had a % selection in the middle of those of Sample 2-1 and Sample 2-4.

The results described above indicate that addition of a trace amount of carboxymethyl cellulose to an alumina raw material (Sample 2-1), addition of a coarse foaming agent to an alumina raw material (Sample 2-2) or use of an alumina raw material containing a fused alumina (Sample 2-4) enables the production of an alumina-based porous support having a peak of the pore size distribution curve within a range from 10 to 100 μm and that the support thus obtained exhibits an excellent performance as a support of a catalyst for ethylene reaction.

TABLE 4

|  | Packing density (kg/l) | Specific surface area (m²/g) | Water absorption (wt %) |
| --- | --- | --- | --- |
| Sample 2-1 | 0.69 | 1.47 | 40.6 |
| Sample 2-2 | 0.70 | 1.43 | 40.0 |
| Sample 2-3 | 0.69 | 1.43 | 40.6 |
| Sample 2-4 | 0.69 | 1.45 | 40.7 |
| Comparative Sample C2-1 (tunnel surface) | 0.69 | 1.49 | 40.5 |

TABLE 5

|  | Apparent porosity (%) | $Na_2O$ content (wt %) | Selection (%) |
| --- | --- | --- | --- |
| Sample 2-1 | 61 | 0.27 | 0.3 |
| Sample 2-2 | 60 | 0.31 | 0.2 |
| Sample 2-3 | 61 | 0.29 | 0.0 |
| Sample 2-4 | 61 | 0.28 | −0.7 |
| Comparative Sample C2-1 (tunnel surface) | 61 | 0.30 | control |

What is claimed is:

1. A method for producing an alumina-based porous support, the method comprising molding an alumina raw material comprising a raw alumina powder into an article; p1 sintering the article for 5 to 8 hours at 1520 to 1560° C. in a roller hearth kiln; and forming the alumina-based porous support, wherein the method further comprises adding 1 to 15 parts by weight of a foaming agent to 100 parts by weight of the alumina raw material.

2. The method according to claim 1, further comprising adding 2.3 to 4.0 parts by weight of carboxymethyl cellulose to 100 parts by weight of the alumina raw material.

3. The method according to claim 1, wherein the alumina raw material further comprises 10 to 25 weight % fused alumina.

4. A method for producing an alumina-based porous support, the method comprising molding an alumina raw material comprising a raw alumina powder into an article;

sintering the article for 5 to 8 hours at 1520 to 1560° C. in a roller hearth kiln; and forming the alumina-based porous support, wherein a pore size distribution curve for the alumina-based porous support has a peak within a range from 10 to 100 μm.

* * * * *